United States Patent
Bourgeois

(10) Patent No.: US 11,983,001 B2
(45) Date of Patent: May 14, 2024

(54) METHOD FOR DETECTING ANOMALIES IN A WATER TREATMENT PLANT USING AN APPARATUS FOR INJECTING OXYGEN INTO A WASTE POOL

(71) Applicant: L'Air Liquide Société Anonyme pour l'Etude et l'Exploitation des Procédés Georges Claude, Paris (FR)

(72) Inventor: Thomas Bourgeois, Paris (FR)

(73) Assignee: L'Air Liquide, Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 145 days.

(21) Appl. No.: 17/442,040

(22) PCT Filed: Feb. 12, 2020

(86) PCT No.: PCT/EP2020/053651
§ 371 (c)(1),
(2) Date: Sep. 22, 2021

(87) PCT Pub. No.: WO2020/193001
PCT Pub. Date: Oct. 1, 2020

(65) Prior Publication Data
US 2022/0163957 A1    May 26, 2022

(30) Foreign Application Priority Data
Mar. 22, 2019   (EP) .................... 19305358

(51) Int. Cl.
*G05B 23/02*    (2006.01)
*C02F 3/26*     (2023.01)
(Continued)

(52) U.S. Cl.
CPC ............ *G05B 23/0283* (2013.01); *C02F 3/26* (2013.01); *G05B 13/0265* (2013.01);
(Continued)

(58) Field of Classification Search
CPC ............ G05B 23/0238; G05B 13/0265; G05B 23/0283; G05B 23/0235; G05B 2219/2605; C02F 3/26
See application file for complete search history.

(56) References Cited

U.S. PATENT DOCUMENTS 5,742,500 A  *  4/1998  Irvin .................... G05D 9/12
                                                  700/282
6,178,393 B1 *  1/2001  Irvin .................... F04D 15/0066
                                                  700/282
(Continued)

FOREIGN PATENT DOCUMENTS

EP    0 626 697    11/1994
EP    0 995 485     4/2000
(Continued)

OTHER PUBLICATIONS

International Search Report for corresponding PCT/EP2020/053651, dated May 6, 2020.
(Continued)

*Primary Examiner* — John E Breene
*Assistant Examiner* — Yaritza H Perez Bermudez
(74) *Attorney, Agent, or Firm* — Yan Jiang

(57) ABSTRACT

A method for operating a water treatment plant, wherein the plant is equipped with an apparatus for injecting a gas containing oxygen into an effluent, the method comprising a phase of detecting anomalies in the operation of the apparatus, wherein the phase of detecting anomalies comprises an implementation of the following steps: providing data representative of the operating state of the apparatus; and providing a system for acquiring and processing said data.

4 Claims, 3 Drawing Sheets

(51) Int. Cl.
*G05B 13/02* (2006.01)
*G06Q 50/06* (2012.01)
(52) U.S. Cl.
CPC ......... *G05B 23/0235* (2013.01); *G06Q 50/06* (2013.01); *C02F 2303/14* (2013.01); *G05B 2219/2605* (2013.01)

(56) References Cited

U.S. PATENT DOCUMENTS

| | | | | |
|---|---|---|---|---|
| 6,270,061 | B1 | 8/2001 | Bouquet et al. | |
| 7,240,479 | B1* | 7/2007 | Fujimoto | F02D 41/1495 60/285 |
| 8,949,045 | B2* | 2/2015 | Skovmose | F04D 15/0088 702/182 |
| 2009/0322525 | A1* | 12/2009 | Graves | G06Q 20/102 700/295 |
| 2016/0060150 | A1* | 3/2016 | Beaudouin | C02F 3/16 210/150 |
| 2017/0060124 | A1 | 3/2017 | Hara | |
| 2017/0097647 | A1 | 4/2017 | Lunani et al. | |
| 2018/0045194 | A1* | 2/2018 | Beard | G05B 23/0283 |
| 2018/0202890 | A1* | 7/2018 | Mutch | G01M 3/28 |
| 2021/0317021 | A1* | 10/2021 | Albans | B01F 27/91 |
| 2022/0153618 | A1* | 5/2022 | Lefranc | G06Q 50/06 |
| 2022/0163957 | A1* | 5/2022 | Bourgeois | G05B 13/0265 |
| 2023/0297807 | A1* | 9/2023 | Cella | G06N 7/01 702/188 |

FOREIGN PATENT DOCUMENTS

| | | |
|---|---|---|
| FR | 2 594 112 | 8/1987 |
| WO | WO 2012 160300 | 11/2012 |
| WO | WO 2016 132108 | 8/2016 |
| WO | WO 2019 045699 | 3/2019 |

OTHER PUBLICATIONS

International Search Report for related PCT/EP2020/053650, dated May 6, 2020.

* cited by examiner

METHOD FOR DETECTING ANOMALIES IN A WATER TREATMENT PLANT USING AN APPARATUS FOR INJECTING OXYGEN INTO A WASTE POOL

CROSS REFERENCE TO RELATED APPLICATIONS

This application is a 371 of International Application No. PCT/EP2020/053651, filed Feb. 12, 2020, which claims priority to European Patent Application No. 19305358.4, filed Mar. 22, 2019 the entire contents of which are incorporated herein by reference.

TECHNICAL FIELD

The present invention relates to the field of water treatment. More precisely, the present invention relates to the detection of anomalies in the operation of water treatment plants, these anomalies being related to malfunction of apparatuses for injecting oxygen into purification tanks. This oxygen is used by the biomass present in the tanks to consume the pollution present in the water.

BACKGROUND

The following documents illustrate examples of such apparatuses: WO2012160300A1, EP-995 485, FR-2594112A1.

These injecting apparatuses, like all robots, are subject to faults.

To the knowledge of the Applicant, there is currently no technical way of detecting faults in such apparatuses in advance: faults occur in these plants and they are dealt with "on the job", on a case-by-case basis.

Some providers propose, to avert such faults, to carry out regular maintenance of these apparatuses, or even to change them regularly. However such preventative maintenance or replacement is necessarily expensive.

SUMMARY

The present invention therefore intends to provide a new method for detecting some of such faults in advance, thus allowing the time between maintenance and apparatus lifetime to be increased.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DETAILED DESCRIPTION OF PREFERRED EMBODIMENTS

As will be seen in more detail below, the method according to the present invention comprises comparing the flow rate of gas (containing oxygen) injected by the apparatus, with the magnitude of the current (i.e. fluid/effluent flow rate) passing through this apparatus.

Figure 1:
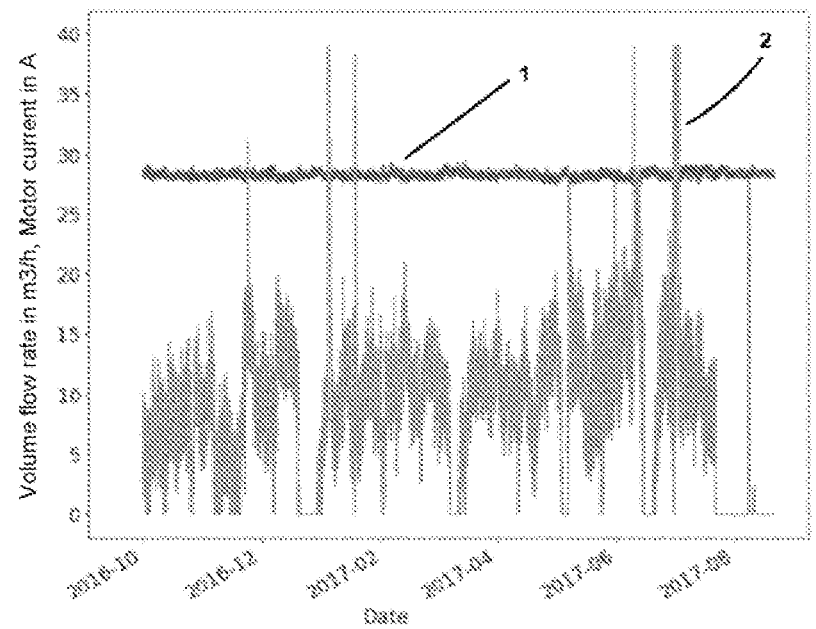
FIG. 1 shows two signals: oxygen flow rate (2, in m$^3$/h) and motor current/fluid flow rate passing through the apparatus versus date.

Appended FIG. 1: in order to better understand the invention, let the graph of appended FIG. 1, which shows two signals: oxygen flow rate (2, in m$^3$/h) and motor current/fluid flow rate passing through the apparatus (1, in A), as a function of time, during a given period of time of about 1 year in 2016/2017, be examined. It will be noted that these trials were carried out using an apparatus such as that illustrated in the aforementioned document WO2012/160300.

It may be seen that it is difficult to draw conclusions because the signals are relatively noisy, and it is in particular not possible to determine whether the oxygen-injecting apparatus used in this plant is operating correctly or not.

Figure 2:
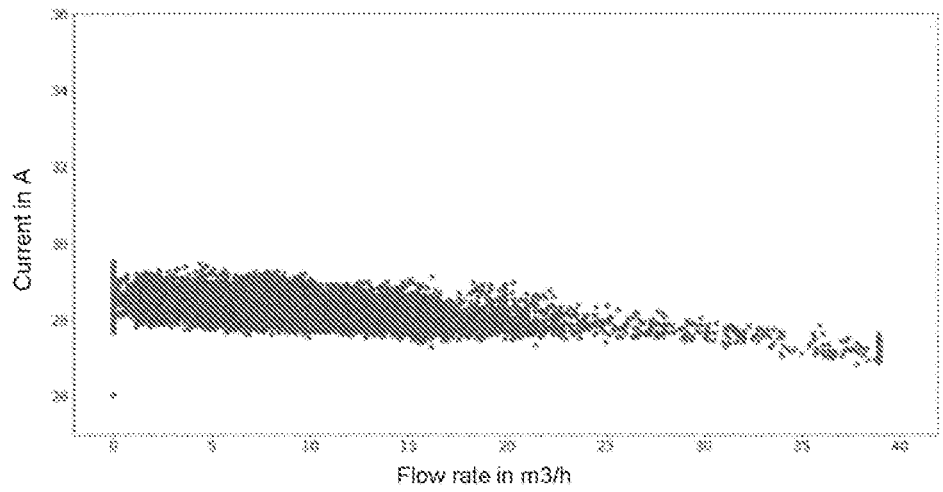
FIG. 2 is a new curve, representing Current (A) as a function of the flow rate of oxygen injected by the apparatus into the treated fluid (flow in m$^3$/h)
Figure 3:
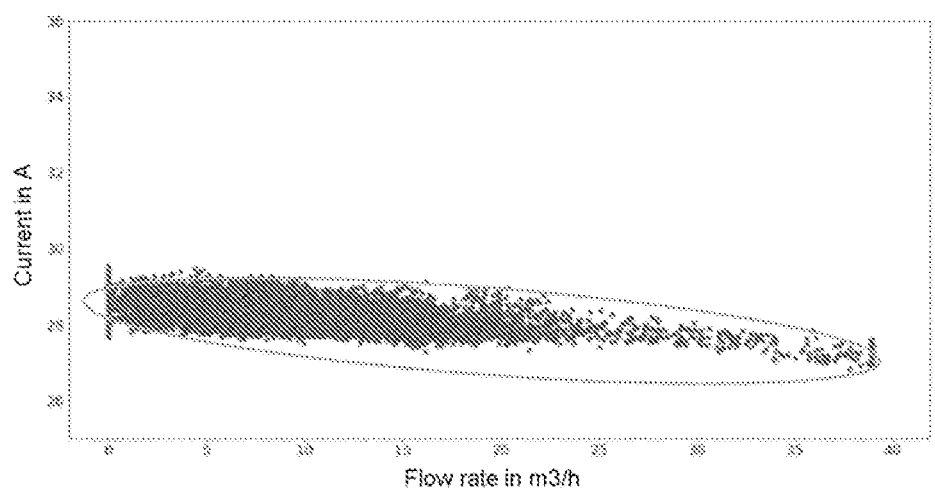
FIG. 3 is a new curve, representing Current (A) as a function of time, but rather as a function of the flow rate of oxygen injected by the apparatus into the treated fluid (flow in m$^3$/h)

Appended FIG. 2 and appended FIG. 3: it is then decided (see appended FIG. 2 and appended FIG. 3) to draw a new curve, representing magnitude (flow rate of fluid passing through the apparatus) not this time as a function of time, but rather as a function of the flow rate of oxygen injected by the apparatus into the treated fluid (flow in m$^3$/h).

The signal is now much more consistent. It is on the basis of this signal that it is proposed to carry out predictive maintenance.

Since the signal is very consistent, it is possible to draw a zone (oblong envelope it FIG. 3) delineating a "normal" operation of the unit.

When the signal departs from the delineated zone for a period of time considered to be of consequence, for example one whole day, it is considered that an alarm may be raised and predictive maintenance of the apparatus requested.

Figure 4:
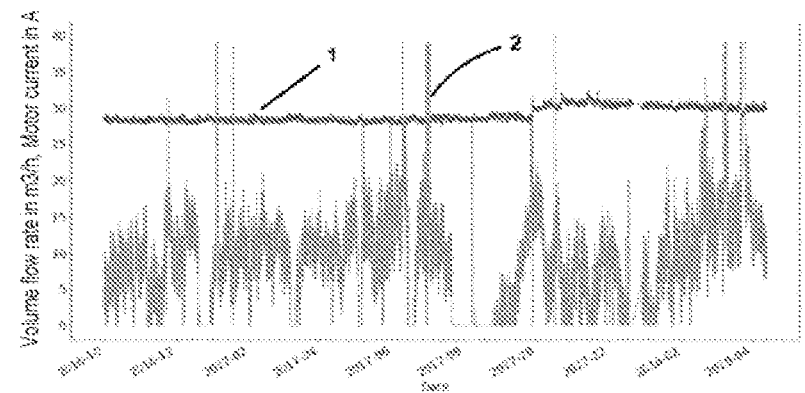
FIG. 4 is the same signals as those of FIG. 1 but over a period of two years in 2016-2018.
Figure 5:
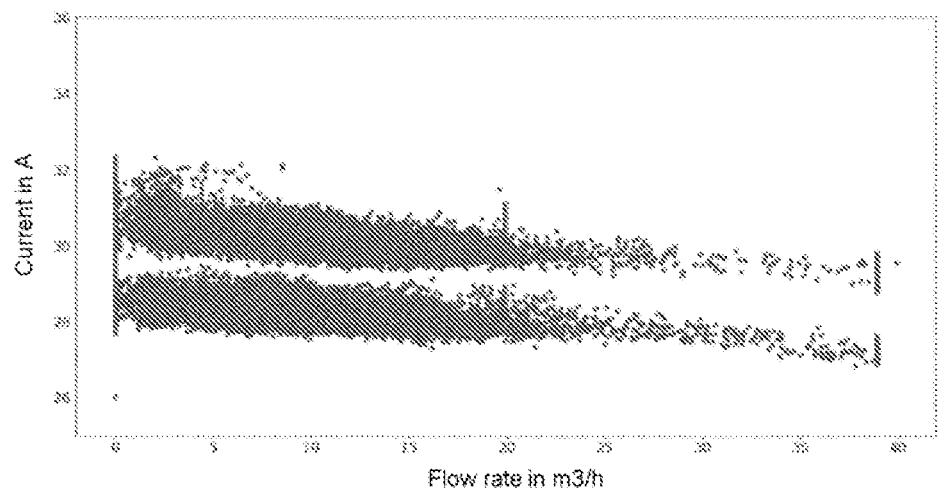
FIG. 5 is show the same signals as those of FIG. 2 as a function of the flow rate of oxygen injected by the apparatus into the treated fluid (flow in m$^3$/h).

Appended FIG. 4 and appended FIG. 5: to confirm the effectiveness of this approach, let the appended graphs of FIGS. 4 and 5, which show the same signals but over a period of two years in 2016-2018, be examined. In FIG. 5, a new zone has been added above the zone corresponding to "normal" operation, this new zone being formed above the first; it corresponds to a new period of operation of the machine, which started at the time of its regular maintenance, which took place very exactly at the end of Sep. 2017, as may also be clearly seen in FIG. 4.

The algorithm according to the present invention allows this new period of operation to be determined automatically. In the same way, it will be able to detect faults, future faults, and other anomalies.

Let the following example of a predictive maintenance algorithm allowing the implementation of the invention be considered:

1. Training over a period of time $t_1$ to $t_m$:
    a. collection of the magnitude (of the electrical current I, in A) and of the flow rate of O$_2$ gas (Q in m$^3$/h), which by themselves define a zone of correct operation $Z=\{(Q_i, I_i)\}_{i=1,m}$.
2. Using the algorithm for $t > t_m$:
given a new time interval t, computing the distance between the new data point and the zone of correct operation with the following formula:

$$d = \sqrt{\frac{(Q(t) - Q_i)^2}{(1 m^3/h)^2} + \frac{(I(t) - I_i)^2}{(1A)^2}}$$

allowing, as was seen above, an anomaly to be detected and a maintenance operation to be requested when $d > \in$.

Example of a duration considered to be alarming: one whole day.

Example of data $\in$: 1.0

The invention therefore relates to a method for operating a water treatment plant, which plant is equipped with an apparatus for injecting a gas containing oxygen into a effluent, the method comprising a phase of detecting anomalies in the operation of the apparatus, characterized in that the anomaly-detecting phase comprises the implementation of the following measures:

data representative of the operating state of the apparatus are provided, said data comprising readings as a function of time of the gas flow rate injected by the apparatus and readings as a function of time of the current/flow rate of fluid passing through the apparatus;

a system for acquiring and processing these data is provided, said system being equipped with an algorithm for processing these data, which is capable of carrying out the following determinations:

a) carrying out a training phase in which the system acquires said readings, establishes, over a determined training time period, the curve of variation in the magnitude of the current flowing through the apparatus as a function of the gas flow rate injected by the apparatus, and defines a zone/envelope encompassing this curve, which zone is considered to delineate a normal operation of the apparatus; and b) carrying out a phase of using the algorithm, in which the system acquires, in real time, over a determined period of time, the curve of variation in the magnitude of the current flowing through the apparatus as a function of the gas flow rate injected by the apparatus, and determining, if the signal departs from said zone/envelope during a period of time considered representative, that it must be concluded that an alarm should be raised, for example with a view to requesting predictive maintenance of the apparatus.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

As used herein, "about" or "around" or "approximately" in the text or in a claim means ±10% of the value stated.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range. Any and all ranges recited herein are inclusive of their endpoints (i.e., x=1 to 4 or x ranges from 1 to 4 includes x=1, x=4, and x=any number in between), irrespective of whether the term "inclusively" is used.

All references identified herein are each hereby incorporated by reference into this application in their entireties, as well as for the specific information for which each is cited.

The invention claimed is:

1. A method for operating a water treatment plant, wherein the plant is equipped with an apparatus for injecting a gas containing oxygen into an effluent, the method comprising the step of:

detecting anomalies in the operation of the apparatus, wherein the detecting anomalies comprises the steps of:

acquiring data representative of the operating state of the apparatus, said data comprising readings as a function of time of a gas flow rate injected by the apparatus and readings as a function of time of a current/flow rate of fluid passing through the apparatus, wherein said data are examined signals of the apparatus during a given period of time; and raising an alarm so that a predictive maintenance of the apparatus is requested, wherein the raising the alarm comprising processing said data with an algorithm capable of carrying out the following determinations:

a) carrying out a training phase, wherein the system acquires said readings, establishes, over a determined training time period, a curve of variation in the magnitude of the current flowing through the apparatus as a function of the gas flow rate injected by the apparatus, and defines a zone/envelope encompassing said readings in this curve, wherein the zone is considered to delineate a normal operation of the apparatus; and b) carrying out a phase of using the algorithm, wherein the system acquires, in real time, over a determined period of time, the curve of variation in the magnitude of the current flowing through the apparatus as a function of the gas flow rate injected by the apparatus, and determining, if the reading departs from the zone/envelope during a period of time considered representative, to conclude that the alarm is raised.

2. The method of claim 1, wherein the alarm is raised with a visual request predictive maintenance of the apparatus.

3. The method of claim 1, wherein the given period of time is one year.

4. The method of claim 1, wherein the given period of time is two years.

* * * * *